(12) United States Patent
Sako et al.

(10) Patent No.: US 7,352,676 B2
(45) Date of Patent: * Apr. 1, 2008

(54) OPTICAL RECORDING MEDIUM AND APPARATUS FOR REPRODUCING OPTICAL RECORDING MEDIUM

(75) Inventors: Yoichiro Sako, Tokyo (JP); Hiroshi Ogawa, Kanagawa (JP); Tatsuya Inokuchi, Kanagawa (JP)

(73) Assignee: Sony Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/484,900

(22) Filed: Jul. 12, 2006

(65) Prior Publication Data

US 2006/0250907 A1 Nov. 9, 2006

Related U.S. Application Data

(60) Continuation of application No. 10/937,822, filed on Sep. 9, 2004, now Pat. No. 7,110,341, which is a division of application No. 09/807,631, filed as application No. PCT/JP00/05314 on Aug. 8, 2000, now Pat. No. 6,853,613.

(30) Foreign Application Priority Data

Aug. 18, 1999 (JP) ............................... P11-232050

(51) Int. Cl.
*G11B 7/00* (2006.01)
(52) U.S. Cl. ...................................................... 369/94
(58) Field of Classification Search ............. 369/53.22, 369/94, 275.3, 47.1, 47.27, 112.01, 112.1, 369/112.23, 47.23
See application file for complete search history.

(56) References Cited

U.S. PATENT DOCUMENTS

| 5,729,525 | A  | 3/1998  | Ishida et al.    |
| 5,828,648 | A  | 10/1998 | Takasu et al.    |
| 6,241,843 | B1 | 6/2001  | Kaneko et al.    |
| 6,269,065 | B1 | 7/2001  | Ogura et al.     |
| 6,298,025 | B1 | 10/2001 | McPherson et al. |
| 6,424,614 | B1 | 7/2002  | Kawamura et al.  |

FOREIGN PATENT DOCUMENTS

| EP | 0426409  | 5/1991  |
| EP | 0751517  | 1/1997  |
| EP | 0762397  | 3/1997  |
| EP | 0884904  | 12/1998 |
| EP | 0890948  | 1/1999  |
| EP | 1059636  | 12/2000 |
| JP | 10112841 | 4/1998  |

*Primary Examiner*—Nabil Hindi
(74) *Attorney, Agent, or Firm*—Lerner, David, Littenberg, Krumholz & Mentlik, LLP

(57) ABSTRACT

An optical recording medium having plural recording layers includes a first recording layer on which first data is to be recorded and a second recording layer on which second data is to be recorded, the first and second data being relevant to one another. The first and second recording layers are layered together, with the second data being recorded at a location in the second recording layer in the vicinity of a location in the first recording layer where the first data relevant to the second data is recorded. Replay signals of variable configurations can be obtained by suitably synthesizing data read out from the respective recording layers.

4 Claims, 7 Drawing Sheets

FRONT L
11—O

FRONT R
O—12

13—O

O—14

REAR L

REAR R

OPTICAL RECORDING MEDIUM AND APPARATUS FOR REPRODUCING OPTICAL RECORDING MEDIUM

CROSS-REFERENCE TO RELATED APPLICATIONS

This application is a continuation of application Ser. No. 10/937,822, filed on Sep. 9, 2004, which is a divisional application of application Ser. No. 09/807,631, filed on Apr. 16, 2001, now U.S. Pat. No. 6,853,613, the disclosures of which are hereby incorporated by reference herein.

BACKGROUND OF THE INVENTION

This invention relates to an optical recording medium and a method and apparatus for reproducing the optical recording medium. More particularly, it relates to an optical recording medium having first and second recording layers and to a method and apparatus for reproducing the optical recording medium.

As a recording medium for a variety of the information, such as audio or video information, an optical disc, as this recording medium, carrying thereon the recorded information, adapted to be reproduced using a light beam, is in widespread use. In such optical disc, it has been proposed to provide for plural recording layers in order to increase the volume of the recordable information.

Meanwhile, in the optical disc having plural recording layers, proposed so far, data in the respective recording layers are recorded so as to be sequentially reproduced from one recording layer to another. That is, in this optical disc, data recorded on one recording layer is reproduced first and subsequently the data recorded on another recording layer is reproduced to reproduce the entire data recorded on each recording layer.

Alternatively, one of plural sectors provided on one recording layer of the optical disc is reproduced first, and subsequently another one of the sectors, provided on another one of the recording layers is reproduced.

In the multi-layered optical disc, proposed so far, the recording capacity of the optical disc is increased by providing plural recording layers. However, the data recorded on the respective recording layers are reproduced without relevance to one another. So, the data recorded on the respectively, recording layers are simply reproduced as the data are recorded in the respective recording layers.

SUMMARY OF THE INVENTION

It is therefore an object of the present invention to provide an optical recording medium in which first and second reciprocally relevant data, recorded on the first and second superposed recording layers can be read out readily by a sole readout mechanism to provide diversified playback information.

An optical recording medium according to the present invention has at least a first recording layer for recording first data and a second recording layer for recording second data relevant to the first data. The first and second recording layers are layered together, the second data being recorded in a location in the second recording layer in proximity to a location in the first recording layer where the first data relevant to the second recording layer is recorded. So, the first and second data, recorded on different recording layers, can be read out sequentially.

The second data is recorded within a range accessible for an objective lens operating as readout means, adapted for reading out the first or second data of the first and second recording layers of the recording medium, by shifting the objective lens from the location of the first recording layer having recorded therein the first data relevant to the second data. So, the first and second data, relevant to each other, recorded on different recording layers, can be read out in succession.

The second data used constitutes a sole unitary recording data along with the first data.

A reproducing apparatus for reproducing data recorded on this optical recording medium according to the present invention includes readout means for reading out first and second data, relevant to each other, recorded in the first and second recording layers superposed on the optical recording medium, and reproducing means for generating playback signals based on the first and second data read out by this readout means. A controller manages control to read out the first and second data recorded on the first and second recording layers and to synthesize the first and second data to output the synthesized first and second data.

According to the present invention, respective data relevant to each other, recorded in the plural layers of the optical recording medium, are read out by readout means, such as an optical pickup, provided with an objective lens, the data so generated being read out alternately and synthesized for reproduction to provide for variegated data reproduction.

Other objects, features and advantages of the present invention will become more apparent from the following detailed description of the present invention and the claims.

DETAILED DESCRIPTION

Figure 1:
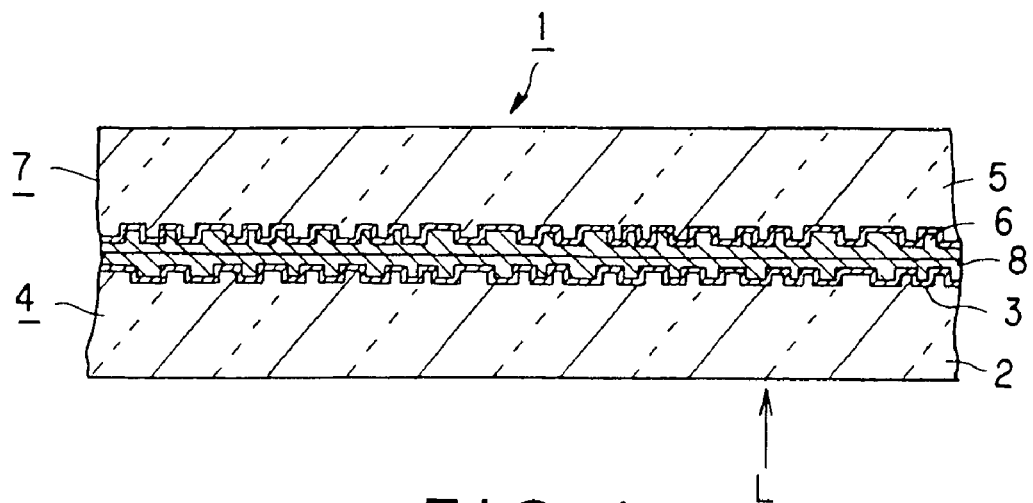
FIG. 1 is a cross-sectional view showing an embodiment of an optical disc of the present invention.

Referring to the drawings, specified embodiments of an optical recording medium and a method and apparatus for reproducing the optical recording medium are explained in detail.

The optical recording medium according to the present invention is constructed, e.g., as an optical disc. The optical disc, to which the present invention is applied, is configured as shown, for example, in FIGS. 1 to 3.

An optical disc 1, shown in FIG. 1, includes a first recording medium 4, comprised of a first recording layer 3 formed on one surface of a first substrate 2, exhibiting light transmission properties, and a second recording medium 7, comprised of a second recording layer 6 formed on one surface of a second substrate 5, exhibiting light transmission properties. The first recording medium 4 and the second recording medium 7 are bonded together via a light-transmitting adhesive layer 8 with the sides thereof carrying the first and second recording layers facing each other. The so-constructed optical disc 1 is made up of the first and second recording layers 3, 6 layered together via adhesive layer 8. Meanwhile, the adhesive layer 8 is of such a sufficient thickness that neither the first recording layer 3 nor the second recording layer 6 is disposed within the depth of focus of a light beam L which will be explained subsequently. The layering in the context of the present specification denotes such a state in which the first recording layer 3 and the second recording layer 6 run parallel to each other, with neither the first recording layer 3 nor the second recording layer 6 being disposed within the depth of focus of the illuminating light beam L.

The first recording layer 3 of the optical disc 1 according to the present invention is formed as a semi-transmitting layer so that light beam L is illuminated onto the second recording layer 6 via the first recording layer 3 from the same direction as the light beam illuminating direction to the first recording layer 3 to reproduce data recorded on the second recording layer 6 based on the light beam reflected back from the second recording layer 6.

In the present optical disc 1, switching between reproduction of data recorded on the first recording layer 3 and data recorded on the second recording layer 6 is by changing the focal point position of the light beam L illuminated on the optical disc 1 between the first recording layer 3 and the second recording layer 6.

Figure 2:
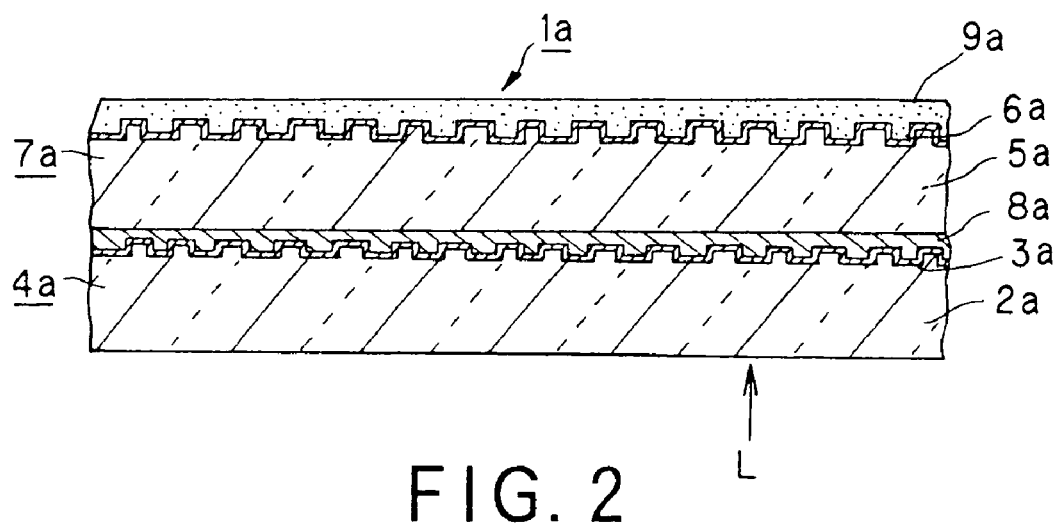
FIG. 2 is a cross-sectional view showing another embodiment of an optical disc of the present invention.

An optical disc 1a, shown in FIG. 2, is made up of a first recording medium 4a, comprised of a first recording layer 3a formed on one surface of a first substrate 2a, exhibiting light transmission characteristics, and a second recording medium 7a, comprised of a second recording layer 6a formed on one surface of a second substrate 5a, exhibiting light transmission characteristics. The first recording medium 4a and the second recording medium 7a are bonded together via a light-transmitting adhesive layer 8a. The optical disc 1a shown in FIG. 2 is comprised of the first and second recording mediums 4a, 7a bonded together side-by-side so that the second substrate 5a will be located on the first recording layer 3a. The first recording layer 3a and the second recording layer 6a are separated from each other by the adhesive layer 8a so that the layers 3a, 6a are not located within the depth of focus of the light beam L which will be explained subsequently.

In the above-described optical disc 1a, data recorded on the first and second recording layers 3a, 6a are reproduced based on a light beam L illuminated from the substrate 2a of the first recording medium 4a and reflected by the first recording layer 3a and also based on a light beam illuminated on the second recording layer 6a via the first recording layer 3a and reflected by the second recording layer 6a of the light illuminated on the second recording layer 6a through the first recording layer 3a. In this optical disc 1a, switching between reproduction of data recorded on the first recording layer 3a and data recorded on the second recording layer 6a is by changing the focal point position of the light beam L illuminated on the optical disc 1a between the first recording layer 3a and the second recording layer 6a.

Figure 3:
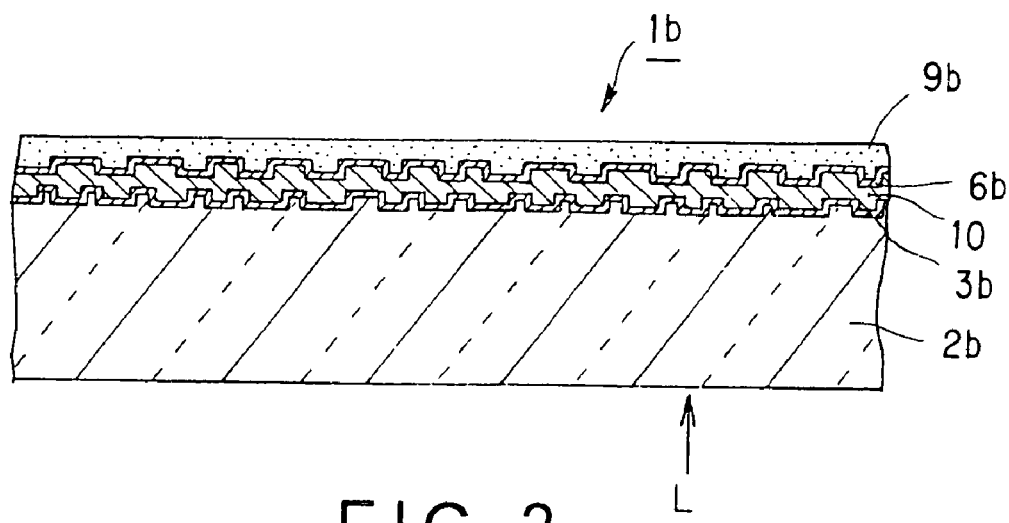
FIG. 3 is a cross-sectional view showing still another embodiment of an optical disc of the present invention.

An optical disc 1b shown in FIG. 3 includes a substrate 2b of light-transmitting synthetic resin, such as polycarbonate resin or glass. On one surface of the substrate 2b is formed a first recording layer 3b. This first recording layer 3b is formed as a semi-transparent film transmitting a pre-set amount of the light beam L illuminated from the substrate 2b and reflecting a pre-set amount. On the first recording layer 3b is layered a second recording layer 6b via an intermediate layer 10 formed of a light-transmitting UV light curable resin. The intermediate layer 10 is formed to a pre-set thickness since it performs the role of optically isolating the first recording layer 3b and the second recording layer 6b from each other so that these layers will not be located within the depth of focus of the objective lens converging and illuminating the light beam L on the recording layers 3b, 6b. On the second recording layer 6b is formed a protective layer 9b of, for example, UV light curable resin, for protecting the surface of the recording layer 6b.

In the above-described optical disc 1b, data recorded on the first and second recording layers 3b, 6b are reproduced by detecting the light beam illuminated from the substrate 2b and reflected by the first recording layer 3b and also by detecting the light beam illuminated on the second recording layer 6b through the first recording layer 3b and reflected by the second recording layer 6b. In this optical disc 1b, switching between reproduction of data recorded on the first recording layer 3b and data recorded on the second recording layer 6b again is by changing the focal point position of the light beam L illuminated on the optical disc 1b between the first recording layer 3b and the second recording layer 6b.

In the optical discs 1, 1a, 1b, according to the present invention, first data and second data, relevant to each other, are recorded on the first recording layers 3, 3a, 3b and the second recording layers 6, 6a, 6b. The first and second data may also be multi-channel audio data synthesized together to give unit recording data, for example, multi-channel audio data which enables surround reproduction.

Figure 4:
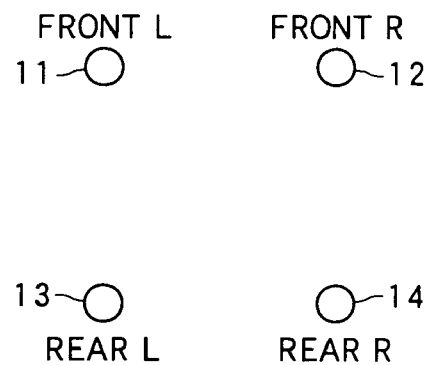
FIG. 4 shows a typical disposition of a loudspeaker for audio signals recorded on an optical disc of the present invention.

The multi-channel audio data are left and right front channel data input to left and right front speakers 11, 12 arranged ahead of an acoustic space forwardly of a listener, and left and right rear channel data input to left and right rear speakers 13, 14 arranged in back of an acoustic space rearwardly of the listener, as shown in FIG. 4. The left and right front channel data are recorded as first data on the first recording layers 3, 3a, 3b, whilst the left and right rear channel data are recorded as second data on the second recording layers 6, 6a, 6b. The first data may be handled as meaningful reproduced main data because the first data reproduced alone enable usual two-channel stereo reproduction. On the other hand, the second data may be handled as sub-data relevant to the main data because it can be reproduced with the first data to enable so-called multi-channel audio reproduction.

Figures 5A, 5B:
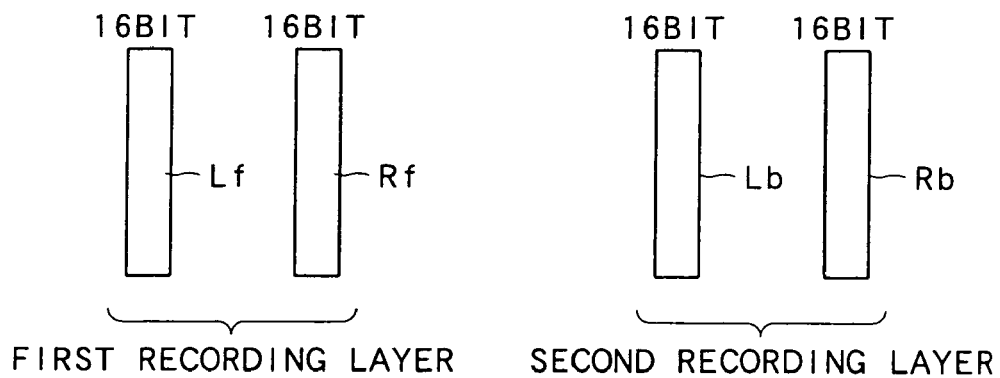
FIGS. 5A and 5B show a data structure of first and second data recorded on the first and second recording layers of the optical disc.

It is noted that left and right front channel data Lf, Rf, recorded as the first data on the first recording layers 3, 3a, 3b, are quantized as 16-bit data for each of the left and right channel data, as shown in FIG. 5A. Moreover, left and right rear channel data Lb, Rb, recorded as the second data on the second recording layers 6, 6a and 6b, are quantized as 16-bit data for each of the left and right channel data, as shown in FIG. 5B.

Figure 6:
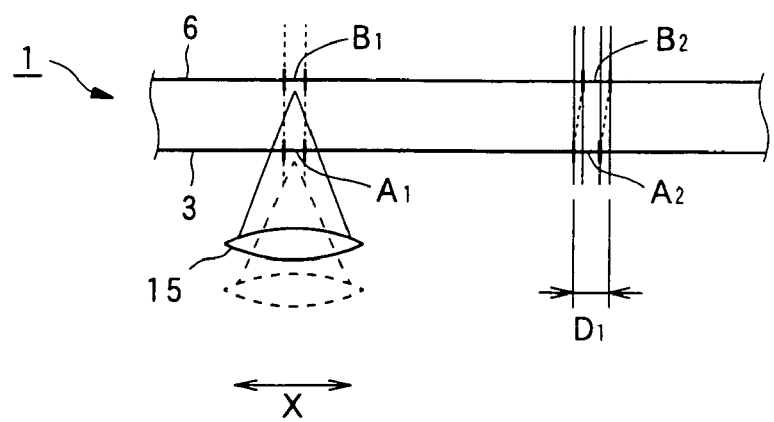
FIG. 6 is a schematically shows the state of recording of data on the first and second recording layers of the optical disc.

Taking the optical disc 1, shown in FIG. 1, as an example, the second data recorded on the second recording layers 6, 6a, 6b are recorded at B1, B2, . . . locations of the second recording layer 6 in the vicinity of A1, A2, . . . locations of the first recording layer 3 in which are recorded first data relevant to the second data. In particular, the second data is recorded within a range D1 accessible for the objective lens 15 of the optical pickup, adapted for reading out the first and second data of the first and second recording layers 3, 6 of the optical disc 1, on shifting the objective lens from the positions A1, A2 in the first recording layer 3, in which are recorded first data relevant to the second data, in a direction indicated by arrow X in FIG. 6 perpendicular to the recording tracks formed in the first and second recording layers 3, 6. This range D1 is a range that may be accessed within the field of view of the objective lens 15 without performing sled feed of the optical pickup in a direction perpendicular to the recording track, by a pickup feed unit, not shown, and is specifically a range of, for example, approximately 200 μm. More specifically, the first and second data are recorded so that the leading ends of the areas of recording of the first and second data in the first and second recording layers 3 and 6 will be within a range of approximately 200 μm from each other. For example, if the first and second data are recorded in the first and second recording layers 3, 6 in the standard format for the Compact Disc (CD), and if the range D1 permits accessing on shifting the objective lens 15 within its field of view, the recording start positions of data of the first and second data are set so as to be within 60 concentrically or spirally extending recording tracks in the first and second recording layers 3 and 6.

The state of recording the first and second data, relevant to each other, in the first and second recording layers 3, 3a, 3b, 6, 6a, 6b, is now explained. This recording is explained with reference to a recording device 21 shown in FIG. 7. Of course, the present invention can be applied to optical discs 1a, 1b shown in FIGS. 2 and 3.

Figure 7:
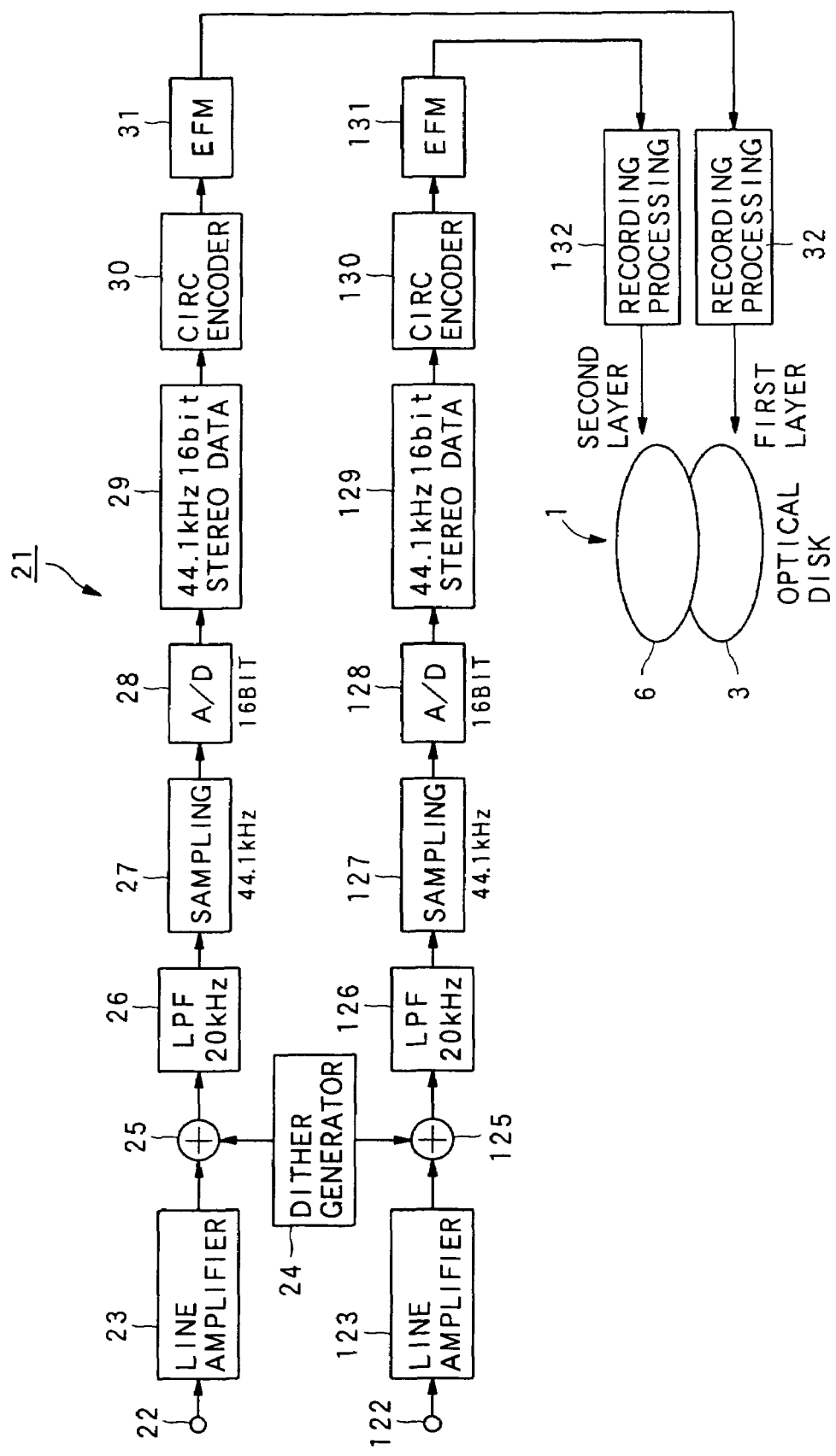
FIG. 7 is a block diagram showing a reproducing apparatus for reproducing an optical disc according to the present invention.

The recording device 21 shown in FIG. 7 includes a first input terminal 22, fed with the first audio signals corresponding to the first data recorded on the first recording layer 3 of the optical disc 1, and a second input terminal 122, fed with the second audio signals corresponding to the second data recorded on the second recording layer 6.

The first and second audio signals, fed to the first and second input terminals 22, 122, are analog audio signals, relevant to each other, and which form multi-channel audio signals which may be synthesized to enable the aforementioned surround reproduction. That is, the analog audio signals, fed to the focussing servo input terminals 22, 122, are converted into left and right front channel data Lf, Rf and left and right rear channel data Lb, Rb, making up relevant audio data of front and rear four channels by signal processing, as later explained, and which are subjected to sampling at the sampling frequency of 44.1 kHz and 16-bit quantization. The front channel data Lf, Rf and the rear channel data Lb, Rb may be said to be relevant data at the same time point on the time axis.

It may be seen from above that the first input terminal 22 is fed with first audio signals, corresponding to the left and right front channel data Lf, Rf, whilst the second input terminal 122 is fed with the second audio signals corresponding to the left and right rear channel data Lb, Rb.

The first audio signals, fed to the first input terminal 22, are amplified by a first line amplifier 23, and then sent to a first adder 25 for addition of a dither as a small random noise from a dither generator 24. From the first audio signals, added to with the dither by the first adder 25, only a band 20 kHz or less is taken out by a first LPF 26, and then routed to a first sampling circuit 27, which then applies sampling processing at a sampling frequency of 44.1 kHz to a filtered output from the first LPF 26. The sampling data from the first sampling circuit 27 is converted by a first A/D converter 28 into 16-bit digital audio data.

In similar manner, the second audio signals, fed to the second input terminal 122, are amplified by a second line amplifier 123, and then sent to a second adder 125 for addition of a dither as a small random noise from the dither generator 24. From the second audio signals, added to with the dither by the second adder 125, only a band 20 kHz or less is taken out by a second LPF 126, and then routed to a second sampling circuit 127, which then applies sampling processing at a sampling frequency of 44.1 kHz to a filtered output from the second LPF 126. The sampling data from the second sampling circuit 127 is converted by a second A/D converter 128 into 16-bit digital audio data.

The first digital data, converted into 16-bit digital audio data derived from the first audio signals output by the first A/D converter 28, are stored in a first buffer memory 29. The first audio data, read out from the first buffer memory 29, is routed to a first error correction encoding circuit 30 where it is encoded by the combination of cross-interleaving and four-order Reed-Solomon code employing an algorithm of CIRC (Cross Interleave Reed Solomon Code) used in a CD. The encoded data from the first error correction encoding circuit 30 is EFMed (eight-to-fourteen modulated) by a first modulation circuit 31 and processed by a first recording processing circuit 32 so as to be recorded by the optical pickup on the first recording layer 3 of the optical disc 1.

The second digital data, converted into 16-bit digital audio data derived from the second audio signals output from the second A/D converter 128, is stored in a second buffer memory 129. The second audio data, read out from the second buffer memory 129, is routed to a second error correction encoding circuit 130 where it is encoded by the combination of cross-interleaving and four-order Reed-Solomon code employing an algorithm of CIRC (Cross Interleave Reed Solomon Code) used in a CD. The encoded data from the second error correction encoding circuit 130 is EFMed (eight-to-fourteen modulated) by a second modulation circuit 131 and processed by a second recording processing circuit 132 so as to be recorded by the optical pickup on the second recording layer 6 of the optical disc 1.

The first digital data recorded on the first recording layer 3 and the second digital data recorded on the second recording layer 6 are recorded with time axis coincidence relative to each other.

In a manner contrary to the above-described embodiment, the left and right front channel data Lf, Rf derived from the first audio signals may be recorded in the second recording layer 6, with the left and right rear channel data Lb, Rb derived from the second audio signals being then recorded on the first recording layer 3.

A reproducing apparatus for reproducing an optical disc 1, having recorded thereon the first and second data pertinent to the first and second recording layers 3, 6, respectively, is now explained.

Figure 8:
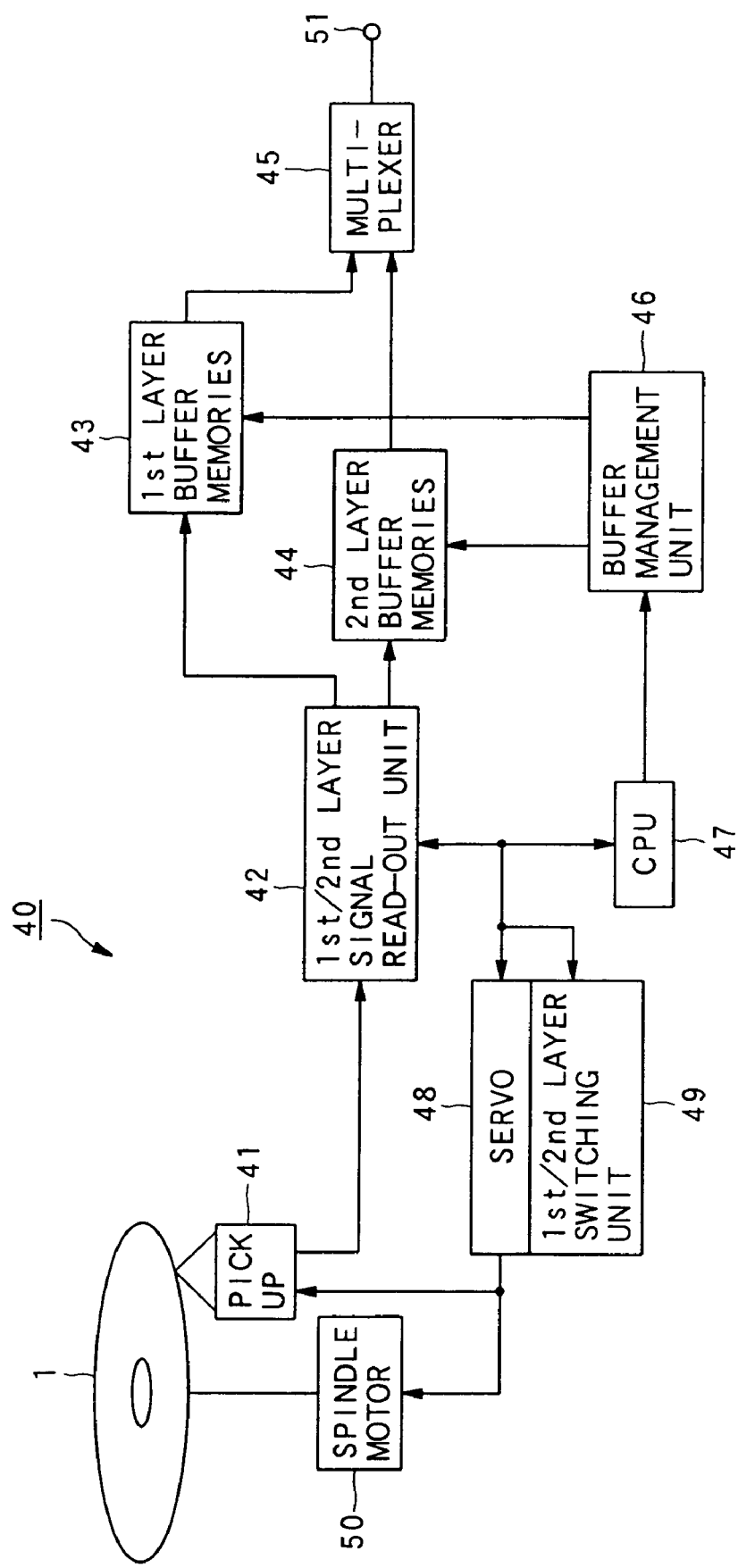
FIG. 8 is a block diagram showing a reproducing apparatus for the optical disc according to the present invention.

Referring to FIG. 8, the reproducing device includes an optical pickup 41 and a signal readout unit 42 for reading out first and second data recorded in the first and second recording layers 3, 6 of the optical disc 1, a first buffer memory 43 for storing the first data recorded in the first recording layer 3 and read out by the optical pickup 41, a second buffer memory 44 for storing the second data recorded in the second recording layer 6, a buffer management unit 46 for supervising and controlling the writing on and readout from the first and second buffer memories 43, 44, a multiplexer 45 for adding or subtracting outputs read out from the first and second buffer memories 43, 44, and a servo circuit 48 for focussing and tracking controlling the objective lens of the optical pickup 41 to focus the light beam radiated from the optical pickup 41 or to cause the light beam radiated from the optical pickup 41 to follow the target recording track on the optical disc 1. This servo circuit 48 includes a switching unit 49 for switching the focussing position of the light beam radiated from the optical pickup 41 in order to converge the light beam by an objective lens of the optical pickup 41 to focus the light beam on the first or second recording layer 3, 6. For switching, that is shifting, the focussing position of the light beam radiated from the optical pickup 41 between the first recording layer 3 and the second recording layer 6, the objective lens of the optical pickup 41 is moved along the optical axis of the objective lens. The reproducing apparatus includes a spindle motor 50 for causing the rotation of the optical disc 1, e.g., at a CLV under control by the servo circuit 48.

The reproducing apparatus 40 includes a controller (CPU) 47 for determining, under instructions from a user, whether the audio data recorded on the first and second recording layers 3, 6 of the optical disc 1 is to be reproduced, whether audio data recorded on the first and second recording layers 3, 6 of the optical disc 1 are synthesized and reproduced or whether an optical disc such as a conventional optical disc is to be reproduced, depending on the configuration of the loaded disc, based on instructions from a user, and for controlling the servo circuit 48, switching unit 49, signal read-out unit 42 and the buffer management unit 46, based on the result of decision. To this controller 47 is connected an operating unit provided with plural operating switches, not shown, for a user to input the aforementioned instructions. In place of the aforementioned instructions from the user, control signals may also be input to the controller 47 from external equipment, such as a personal computer, not shown.

In this reproducing apparatus 40, the audio data read out from the first and second recording layers 3, 6 are adapted for being stored in the buffer memories 43, 44. Alternatively, these audio data may also be stored in a sole common buffer memory.

In this reproducing apparatus 40, the first and second digital data, read out by the optical pickup 41 from the first and/or second recording layers 3, 6, are routed to the signal read-out unit 42. Based on the control signal from the servo circuit 48 or the switching unit 49, the optical pickup 41 switches the focussing position of the light beam on the first recording layer 3 or on the second recording layer 6 for controlling the light beam focussing state to follow surface shaking of the optical disc 1 and for controlling the light beam to follow the recording tracks of the first and second recording layers 3, 6.

The signal read-out unit 42 performs pre-set playback signal processing, such as RF processing, demodulation or error correction processing, on the first and second digital data read out from first or second recording layer 3 or 6, as output signals from the optical pickup 41, to route output data derived from the first digital data and output data derived from the second digital data to the first buffer memory 43 and to the second buffer memory 44, respectively.

The first buffer memory 43 is a playback memory for first digital data, read out from the first recording layer 3, whilst the second buffer memory 44 is a playback memory for second digital data, read out from the second recording layer 6. The first buffer memory 43 or the second buffer memory 44 is controlled and supervised by the buffer management unit 46 as to data writing from the signal read-out unit 42 or data readout from the buffer memory 44.

Next, the operation of the reproducing apparatus 40 shown in FIG. 8 is explained in detail.

If a playback mode selection button of an operating unit, not shown, provided on the reproduction apparatus 40 and which is connected to the controller 47, is acted on by the user, and the playback mode of multiplexing and reproducing the first and second data recorded on the first and second recording layers 3, 6, is selected, the data is reproduced by the following operations: If the playback mode of multiplexing and reproducing the data is selected, the controller (CPU) 47 decides to multiplex and reproduce the first and second data read out from the first and second recording layers 3, 6 of the optical disc 1. If the multiplexing reproduction is selected, the optical pickup 41 is controlled by the servo circuit 48 or the switching unit 49 so that the focussing point of the playback light beam will be switched to the first recording layer 3 or to the second recording layer 6 based on the control signal supplied from the controller 47. The timing of switching of the focussing point of the light beam to the first recording layer 3 or to the second recording layer 6 is such that, if second data recorded on the second recording layer 6 is to be reproduced after reproducing the first data recorded on the first recording layer 3, the focussing point of the light beam is shifted to a location temporally behind a replay end point of the first data of the first recording layer 3 to start the reproduction of the second data, the second data is reproduced to a location temporally ahead of a replay end point of the audio data of the first recording layer 3 and the focussing point of the light beam is shifted to a location on the first recording layer 3 next to the last readout point to reproduce the first data.

Figure 9A:
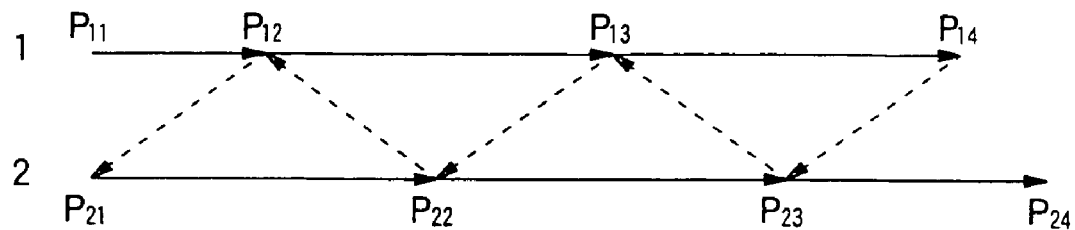
FIGS. 9A and 9B show switching timing in reproducing the first and second data

That is, if, after reproducing the first data from a point P11 to a point P12 on the first recording layer 3, the focussing point of the light beam is to be shifted to the second recording layer 6, as shown in FIG. 9A, the second data is started to be reproduced from a point P21 temporally retrograding from a replay end point P12 of the first recording layer 3. After reproducing the second data to a point P22 temporally ahead of the replay end point P12 of the first recording layer 3, the focussing point of the light beam is shifted to a point P12 on the first recording layer 3 to start reproducing the first data. Data reproduction of the first data as from the point P12 of the first recording layer 3 is continued up to a point P13 temporally ahead of the replay end point P22 of the second recording layer 6. If the light beam focussing point is to be shifted to the second recording layer 6, the second data is reproduced at a temporally previous replay end point P22 of the second recording layer 6 up to a point P23 temporally ahead of the replay end point P13 of the first recording layer 3.

The first and second data, read out from the first recording layer 3 and the second recording layer 6 at the replay timing shown in FIG. 9A, are routed to the signal read-out unit 42 where replay signal processing occurs in accordance with the aforementioned timing. When outputting readout signals read out from the first recording layer 3 or the second recording layer 6, the signal read-out unit 42 outputs identification signals, pre-recorded on the first recording layer 3 and the second recording layer 6 for indicating the recording layers 3, 6, respectively, to the controller 47. The controller 47 then discriminates, based on the furnished identification signals, whether the output data from the signal read-out unit 42 has been read out from the first recording layer 3 or from the second recording layer 6, and controls the data writing timing to or readout timing from the first and second buffer memories 43, 44 through the buffer management unit 46.

The data writing timing to the first and second buffer memories 43, 44 is the same as the replay timing shown in FIG. 9A or the readout timing in the signal read-out unit 42. On the other hand, the data readout timing from the first and second buffer memories 43, 44 is such that, after a pre-set amount of data has been written in one of the first and second buffer memories 43, 44, the data readout is started from the other of the first and second buffer memories 43, 44. Theoretically, the optical disc 1 is run in rotation at an rpm not less than double the standard rpm to read out the first and second data from the first recording layer 3 and the second recording layer 6 of the optical disc 1, at a speed not less than the standard speed, to write data in the first and second buffer memories 43, 44. The first and second data, recorded on the first and second recording layers 3, 6, are read out from the respective buffer memories 43, 44 and output at an output terminal 51 after multiplexing by a multiplexer 45. For reading out the first recording layer 3 and the second recording layer 6 at a haploid speed, that is at a standard speed prescribed in the reference standard manual, data readout from the optical disc 1 needs to be performed at a speed twice the aforementioned standard speed, if the switching time for reproduction timing of the first and second recording layers 3, 6 is discounted. In actuality, the spindle motor 50 is desirably run in rotation at a quadrupled or higher speed to read out data from the optical disc 1.

Figure 9B:
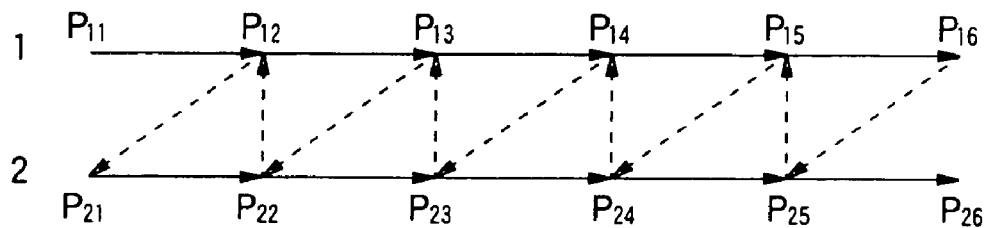

Meanwhile, the timing of switching the focussing position of the replay light beam, radiated from the optical pickup 41, between the first recording layer 3 and the second recording layer 6, under control by the controller 47, may be such timing as is shown in FIG. 9B. If data is reproduced from the point P11 up to the point P12 on the first recording layer 3, and reproduction is to be shifted to the second recording layer 6, the focussing point of the replay light beam reverts to a point temporally previous to the replay end point P12 on the first recording layer 3 to start reproduction of the second data of the second recording layer 6 as from the point P21. After reproducing up to a point P22 of the same timing on the time axis as the replay end point of the first recording layer 3, the focussing point of the replay light beam is shifted to the point P12 on the first recording layer 3 to start reproduction of the first data of the first recording layer 3 as from the point P12. The first data continues to be reproduced from the point P12 of the first recording layer 3 up to the point P13 temporally ahead of the replay end point P22 of the second recording layer 6. If reproduction is to be shifted to the second recording layer 6, the focussing position of the replay light beam reverts to the replay end time point P22 of the second recording layer 6 to reproduce the second data of the second recording layer 6 up to the point P23, which is the same time point as the replay end time point P13 of the first recording layer 3.

The signal read from the first recording layer 3 and the second recording layer 6 in the replay timing shown in FIG. 9B are routed to the signal read-out unit 42 where replay signal processing is carried out in accordance with the aforementioned timing.

By reproducing the first and second data, relevant to each other, recorded on the first and second recording layers 3, 6 of the optical disc 1, by the reproducing apparatus 40, shown in FIG. 8, and by synthesizing the reproduced data by the multiplexer 45, it is possible to achieve stereo reproduction of four channels comprising left and right front channel data Lf, Rf and left and right rear channel data Lb, Rb.

The first and second data, recorded on the first and second recording layers 3, 6 of the optical disc 1, and which are related to each other to constitute sole unit recording data, are recorded in a tracking control range within the field of view of the objective lens, without relying upon the sled feed of the optical pickup 41 by a pickup feed unit, not shown, in a direction along the radius of the optical disc 1, that is, in a direction perpendicular to the recording track. So, it is possible to reduce the amount of movement of the optical pickup 41 in a direction perpendicular to the recording track to reproduce and synthesize the first and second data sequentially smoothly.

If, in the reproducing apparatus 40, shown in FIG. 8, a playback mode selection button of an operating unit, not shown, provided in the apparatus 40, is acted on by the user, and the user's command is to reproduce only the first data recorded on the first recording layer 3 of the optical disc 1, the operating unit 47 decides reproduction only of the first data from the first recording layer 3. At this time, the optical pickup 41 is controlled by the servo circuit 48 and the switching unit 49 so that the light beam is focussed on the first recording layer 3 of the optical disc rotationally driven by the spindle motor 50 to scan only the first recording layer 3. If the optical pickup 41 is controlled to scan the first recording layer 3, the return light beam, reflected only from the first recording layer 3, is received by a photodetector of the optical pickup 41, an output signal of which is routed to the signal read-out unit 42 where signal processing is performed on the audio data recorded on the first recording layer 3. The first data recorded on the first recording layer 3 detected by the signal read-out unit 42 is processed in a pre-set fashion and written in the first buffer memory 43 at a pre-set timing under control by the buffer management unit 46. The data is then read out from the first buffer memory 43 and output via multiplexer 45 at the output terminal 51.

The first data, read out from the first recording layer 3, is converted via an error interpolator, an LPF and a D/A converter, all not shown, connected to the output terminal 51, into analog audio signals, which are output.

If the replay mode selection button of an operating unit, not shown, provided in the reproducing apparatus 40, is acted on by the operator, and the replay mode of reproducing only the second data recorded on the second recording layer 6 of the optical disc 1 is selected, the processing similar to that in case of the selection of the reproducing mode of reproducing only the first recording layer 3 is performed to read out the second data recorded in the second recording layer 6, and the data so read out is output as the reproduced second data at the output terminal 51. Alternatively, the second data may be converted into and output as analog audio signals, as in the case of the aforementioned first data.

Meanwhile, if the optical disc 1 of the present invention is arranged as shown, for example, in FIG. 3, in which the second recording layer 6 of the focussing servo recording layers 3, 6, in which to record left and right rear channel data Lb, Rb corresponding to the first audio signals, is of a reflectance which permits reproduction by a reproducing apparatus capable of reproducing a routine CD, and recording thereon is made in a format satisfying the CD format, the optical disc 1*b* can be reproduced in the reproducing apparatus designed to reproduce the routine CD. Four-channel stereo reproduction can be realized by using a reproducing apparatus configured as shown in FIG. 8 for reproducing the first and second recording layers 3*b*, 6*b* and by synthesizing and reproducing left and right front channel data Lf, Rf and left and right rear channel data Lb, Rb.

Of the four-channel audio data, recorded in the optical disc 1, left and right front channel data Lf, Rf are recorded as first data in the first recording layer 3, while left and right rear channel data Lb, Rb are recorded as second data in the second recording layer 6. Alternatively, a variety of data relevant to one another to constitute sole unit recording data may be recorded in the focussing servo recording layers 3, 6.

Figure 10:
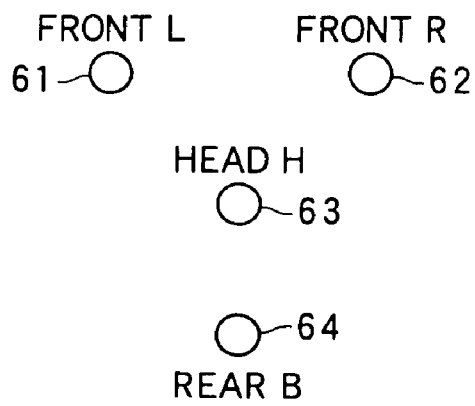
FIG. 10 shows another typical disposition of a loudspeaker for audio signals recorded on an optical disc of the present invention.
Figure 11:
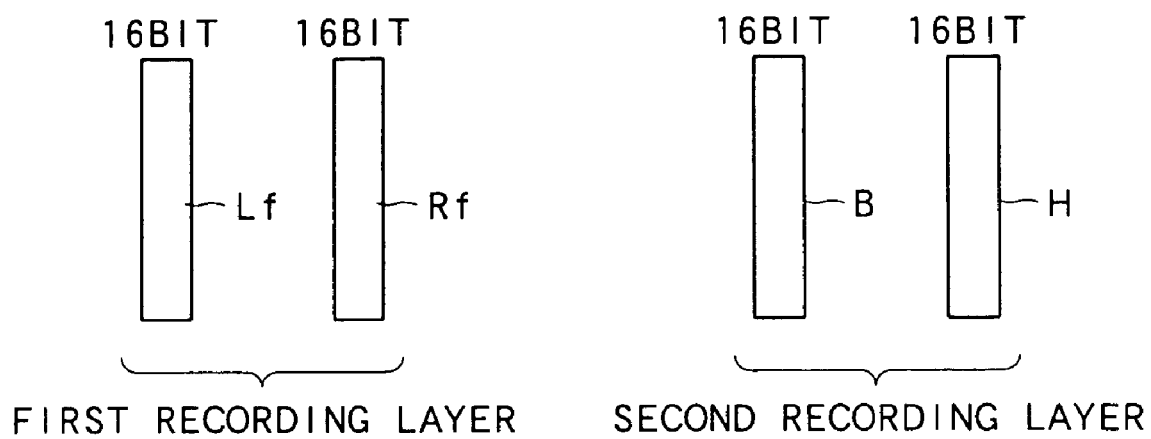
FIG. 11 shows another typical data structure of first and second data recorded on an optical disc of the present invention.

If the audio data recorded on the optical disc 1 is multi-channel data comprised of left and right front channel data Lf, Rf, input to the left and right front speakers 61, 62, arranged on the front side of an acoustic space, rear channel data B input to a rear speaker 64 arranged on the rear side and upper channel data H input to an upper speaker 63 arranged above the listener's head, as shown in FIG. 10, it is sufficient if the front channel data Lf, Rf are recorded as first data in the first recording layer 3 and the rear channel data B and the upper channel data H are recorded as second data in the second recording layer 6.

If the multi-channel data is recorded in a split fashion in the first and second recording layers 3, 6 and only the first data recorded in the first recording layer 3 is reproduced, two-channel stereo reproduction by the left and right front speakers 61, 62 can be performed, whereas, if the first and second data recorded in the first and second recording layers 3, 6 are synthesized and reproduced, multi-channel stereo reproduction can be performed using the left and right front speakers 61, 62, rear speaker 64 and the upper speaker 63.

Figure 12:
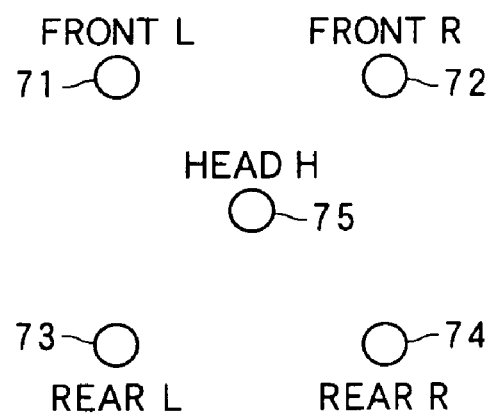
FIG. 12 shows still another typical disposition of a loudspeaker for audio signals recorded on an optical disc of the present invention.
Figure 13:
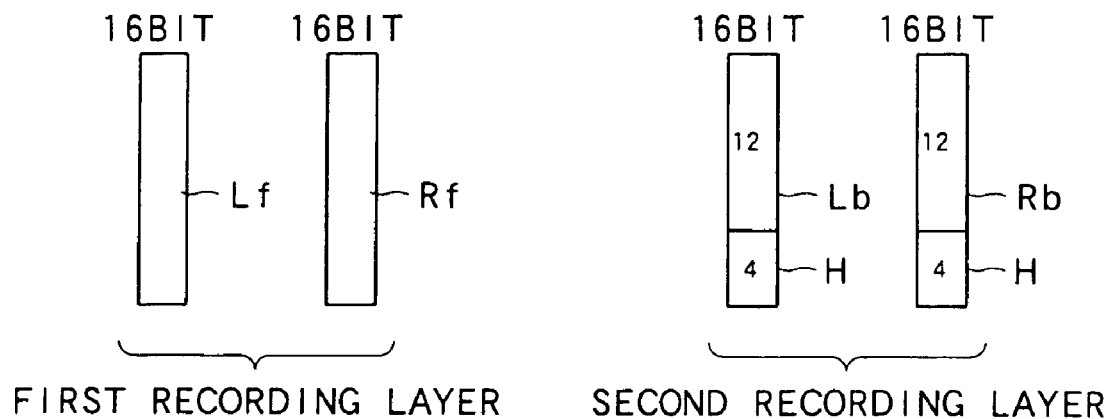
FIG. 13 shows still another typical data structure of first and second data recorded on an optical disc of the present invention.

On the other hand, if the audio data recorded on the optical disc 1 is the multi-channel data made up of left and right front channel data Lf, Rf input to the left and right front speakers 71, 72 arranged forwardly of an acoustic space, rear channel data Lb, Rb input to the left and right rear speakers 73, 74, arranged at back of the acoustic space, and the upper channel data H input to the upper speaker 75 arranged overhead, as shown in FIG. 12, the front channel data Lf, Rf are recorded as first data in the first recording layer 3, whilst the rear channel data Lb, Rb and the upper channel data H are recorded as second data in the second recording layer 6, as shown in FIG. 13. At this time, the rear channel data Lb, Rb and the upper channel data H are recorded in upper 12 bits and in lower 4 bits of the quantized 16-bit second data of each of the left and right channels recorded in the second recording layer 6, respectively.

Figure 14:
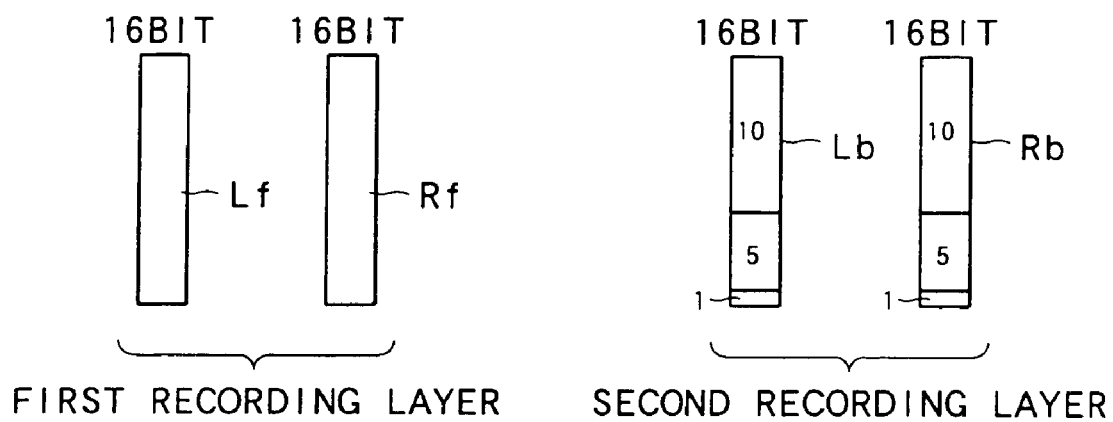
FIG. 14 shows yet another typical data structure of first and second data recorded on an optical disc of the present invention.

Referring to FIG. 14, it is also possible to record 16-bit front channel data Lf, Rf as first data in the first recording layer 3, and to record the rear channel data Lb, Rb, data of audio signals in the mid frequency range and data of the audio signals in the low frequency range, in upper 10 bits, mid 5 bits and in the lower one bit of the quantized 16-bit second data of each of the left and right channels recorded in the second recording layer 6.

In recording the first and second data as shown in FIGS. 13 and 14, the first and second data are recorded in a range that can be accessed by movement in the field of view of the objective lens of the optical pickup 41.

By recording data relevant to one another to constitute a unit recording data in the first and second recording layers or in three or more recording layers, in a split fashion, it is possible not only to increase the recording capacity on a disc but also to reproduce the information of variable sorts.

The first and second data recorded in the first and second recording layers of the optical disc may constitute, in addition to the aforementioned multi-channel audio data, data relevant to one another or a sole recording data unit, as now explained.

For example, there are occasions where the first data is upper order bits of the quantized data, with the second data then being lower order bits of the quantized data, the first data is audio data, with the second data being text data relevant to this audio data, such as lyric or image data, the first data is image data, with the second data then being data relevant to the image data, such as title or synopsis data, and so on. In these cases, the audio data as the first data or the image data, reproduced alone, may be handled as meaningful data, whilst the second data, such as text or title data, may also be handled as sub-data relevant to the first or main data. Of course, the combination of the first and second data may be other than that explained above only by way of illustration.

If, in recording the first and second data relevant to each other in the first and second recording layers of the optical disc, the first and second data are recorded with the same format, inclusive of the recording density, in the recording tracks formed at approximately equal positions of the first and second recording layers, it is sufficient to cause the movement of the objective lens in a direction parallel to the optical axis of the objective lens along the direction of thickness of the optical disc, that is in the focussing direction, when the first and second data recorded in the first and second recording layers are read out in a switching fashion by the sole optical pickup, thus assuring facilitated control of the optical pickup.

In the above-described embodiment, the optical recording medium is an optical disc, however, the optical recording medium may also be a card type recording medium, such as an optical card.

According to the present invention, as described above, the second data recorded in the second recording layer of first and second recording layers layered together is recorded in a location adjacent to a location of the first recording layer where the first data relevant to the second data is recorded. So, the movement range of readout means, such as optical pickup, for reading out the first and second data recorded in different recording layers can be diminished and hence the first and second data can be read out smoothly in a switching fashion to reduce the size of the buffer memory provided in the reproducing apparatus to realize saving in power consumption.

Moreover, since the relevant data can be recorded in plural recording layers, replay signals of variable configurations can be produced by suitably synthesizing data read out from the respective recording layers.

The invention claimed is:

1. A reproducing apparatus for an optical recording medium having a first recording layer for recording first data and a second recording layer for recording second data, the first and second recording layers being positioned adjacent to one another and the second data being recorded at a location in the second recording layer in proximity to a location in the first recording layer where first data relevant to the second data is recorded, the reproducing apparatus comprising:

readout means for reading the first data as main data from the optical recording medium and for reading the second data as sub-data relevant to the main data from the optical recording medium, the readout means accessing from one recording layer to the other recording layer by shifting an objective lens in a non-radial direction on the optical recording medium within a field of view of the objective lens without moving a sled mounting the objective lens;

reproducing means for generating replay signals based on the main data and the sub-data read by the readout means; and control means for controlling the readout means and the reproducing means.

2. The reproducing apparatus according to claim 1, wherein the main data is front channel data of an audio signal and the second data is rear channel data of the audio signal.

3. The reproducing apparatus according to claim 1, wherein the main data is two-channel data of a stereo audio signal.

4. The reproducing apparatus according to claim 1, wherein the control means controls synthesization of the main data and the sub-data read by the readout means to output the replay signals.

\* \* \* \* \*